United States Patent [19]

Ogawa

[11] Patent Number: 5,679,987
[45] Date of Patent: Oct. 21, 1997

[54] METHOD AND DEVICE FOR OBTAINING CONNECTIVITY INFORMATION OF TELECOMMUNICATION FACILITIES

[76] Inventor: Hideharu Ogawa, 2-6-18, Ohsaki, Shinagawa-ku, Tokyo, Japan

[21] Appl. No.: 551,573

[22] Filed: Nov. 1, 1995

Related U.S. Application Data

[63] Continuation of Ser. No. 60,312, May 11, 1993, abandoned.

[30] Foreign Application Priority Data

May 13, 1992 [JP] Japan .................................. 4-120758

[51] Int. Cl.$^6$ ............................................. B60Q 1/00
[52] U.S. Cl. ........................ 307/147; 379/1; 324/66; 340/825.49; 340/508
[58] Field of Search ........................ 379/19, 25, 26, 379/397; 307/147, 145, 148, 42, 650; 340/508, 518, 525, 825.49, 825.79, 825.06, 825.08, 825.1; 324/66; 395/921

[56] References Cited

U.S. PATENT DOCUMENTS

| | | | |
|---|---|---|---|
| 4,274,086 | 6/1981 | Benckendorff | 340/508 |
| 4,748,402 | 5/1988 | Sellati | 324/66 |
| 4,906,970 | 3/1990 | Momura | 340/525 |

*Primary Examiner*—William M. Shoop, Jr.
*Assistant Examiner*—Peter Ganjian
*Attorney, Agent, or Firm*—Fay, Sharpe, Beall, Fagan, Minnich & McKee

[57] ABSTRACT

The invention discloses a method and its device for acquiring swiftly and firmly the connectivity information of electric conductor cords for connecting a plurality of apparatus groups or switching boards in information wiring facilities. The unused extra cores of an electric plural core conductor cord for connecting every apparatuses of apparatus groups A and B with each other through switching boards are connected to a voltage applicator and a voltage (or current) detector through information collecting connectors and the electric connectivity restrictions between every apparatuses of the apparatus groups of the electric conductor cord described above are acquired depending on its electric conduction. According to the invention, the connectivity information of the electric conductor cords in information wiring facilities can be obtained accurately and firmly. Furthermore, the use of the extra cores enable to reduce the cost of the device and to easily apply the invention to the facilities already built.

5 Claims, 5 Drawing Sheets

METHOD AND DEVICE FOR OBTAINING CONNECTIVITY INFORMATION OF TELECOMMUNICATION FACILITIES

This is a continuation of application Ser. No. 08/060,312 filed on May 11, 1993, now abandoned.

BACKGROUND OF THE INVENTION

1. Field of the Invention

The present invention relates to a method and device for acquiring the connectivity information of information wiring facilities in particular, telecommunication cable facilities. The connectivity information is the information indicating the connection of apparatuses of an apparatus group A with the apparatuses of an apparatus group B.

2. Description of the Prior Art

As shown in FIG. 6, a plurality of apparatuses of apparatus group A1 and a plurality of apparatuses of apparatus group B3 are preliminarily wired to relay boards 5 and 7, respectively. Providing relay boards 5 and 7 between apparatus groups A1 and B3 and connecting the apparatuses thereof through optional connectors on each board increases the degree of freedom for wiring and lay out of connection. It can be done only by replacing the electric conductor cord 9 between the relay boards as shown in FIG. 7. For example in FIG. 6, apparatus A in apparatus group A1 was connected to apparatus B in apparatus group B3, but it can be altered to connect to apparatus C as shown in FIG. 7. This method has been known to be effective.

In the case of using this method, the acquiring the connectivity information of which apparatus is presently connected to which apparatus is necessary for control of the apparatuses and for management of failures.

In the case of examining this connectivity information, the connectivity information acquisition was limited only to human manual operation, visual inspection and so forth.

However, the connectivity restriction acquisition due to human manual operation and visual inspection causes a majority of errors and requires labor and time, leading to damage such as cord breakdown, particularly in the case that a majority of apparatuses are connected.

SUMMARY OF THE INVENTION

While the invention is believed to be readily understood from the above description, a brief summary will now be set forth.

It is accordingly a primary object of this invention to provide a method and its device for swiftly and firmly acquiring the connectivity restriction of the electric cords in which a plurality of apparatus groups in an information wiring facility or relay boards are connected to each other.

The acquisition method for connectivity restrictions of information wiring facilities of the present invention comprises the steps of connecting the unused extra cores of a plural core conductor cord for connecting every apparatuses of the apparatus groups A and B to each other, between the terminals of the electric conductor cord, and acquiring the electric connectivity information between every apparatuses of the apparatus groups A and B of the conductor cord, depending on the conduction.

The acquisition device for connectivity information of information wiring facilities of the present invention comprises a telecommunication cable device for connecting every apparatus of a plurality of apparatus groups A and B to each other with an electric plural core conductor cord; information collecting connectors of the apparatus groups A and B for connecting the unused extra cores of the electric conductor cord by a conductor; and an information collection device connected to the information collecting connectors. The information collection device described above further comprising an electric applicator for applying a voltage to each terminal-of the information collecting connector for said apparatus group B, a voltage or current detector connected to each terminal of the information collecting connector for said apparatus group A, a judging means for judging by the voltage or current detected at the terminal of the information collecting connector for said apparatus A by said detector, which apparatus is connected to said apparatus groups A and B with each other; and a control unit for giving the output of the result to an output unit.

Further objects and advantages of the present invention will be apparent from the following description, reference being had to the accompanying drawings wherein preferred embodiments of the present invention are clearly shown.

Figure 1:
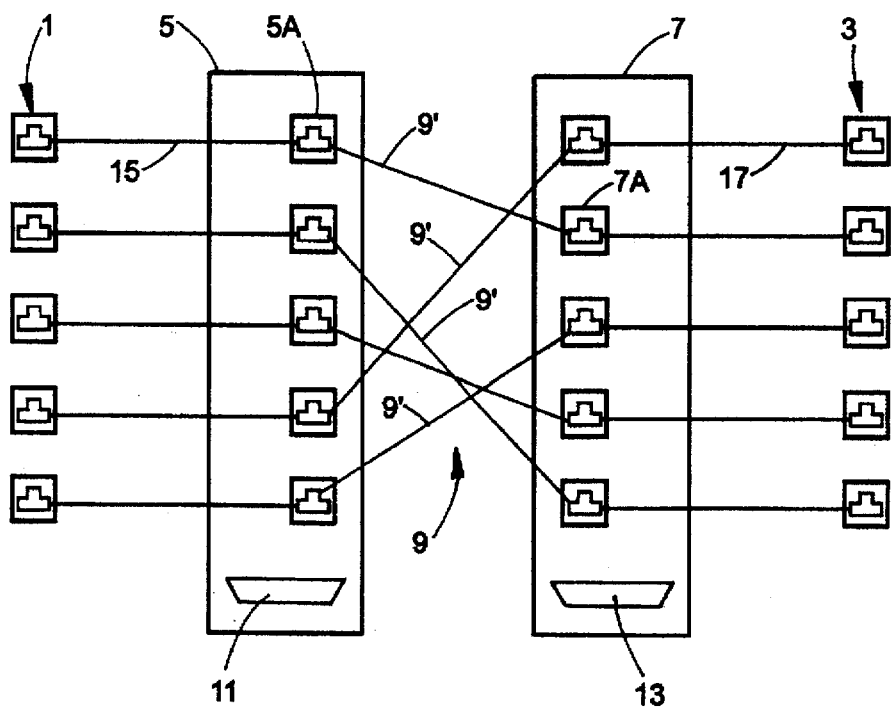
FIG. 1 is a schematic view as a preferred embodiment of the invention.

In the drawings, explanation of reference characters and numerals is as follows:
1: apparatus group A
3: apparatus group B
5: relay board
5A: cord connecting connector
7: relay board
7A: cord connecting connector
9: electric plural core conductor cord
11: information collecting connector
13: information collecting connector
19: wiring to information collecting connector
23: connection cable
25: connection cable
27: information collection device
29: voltage applicator
31: switching board
33: switching board
35: voltage (current) detector
37: result output unit
39: control unit.

DETAILED DESCRIPTION OF PREFERRED EMBODIMENTS

Referring now to the drawings, the detailed description of the invention will be given in the following.

Figure 2:
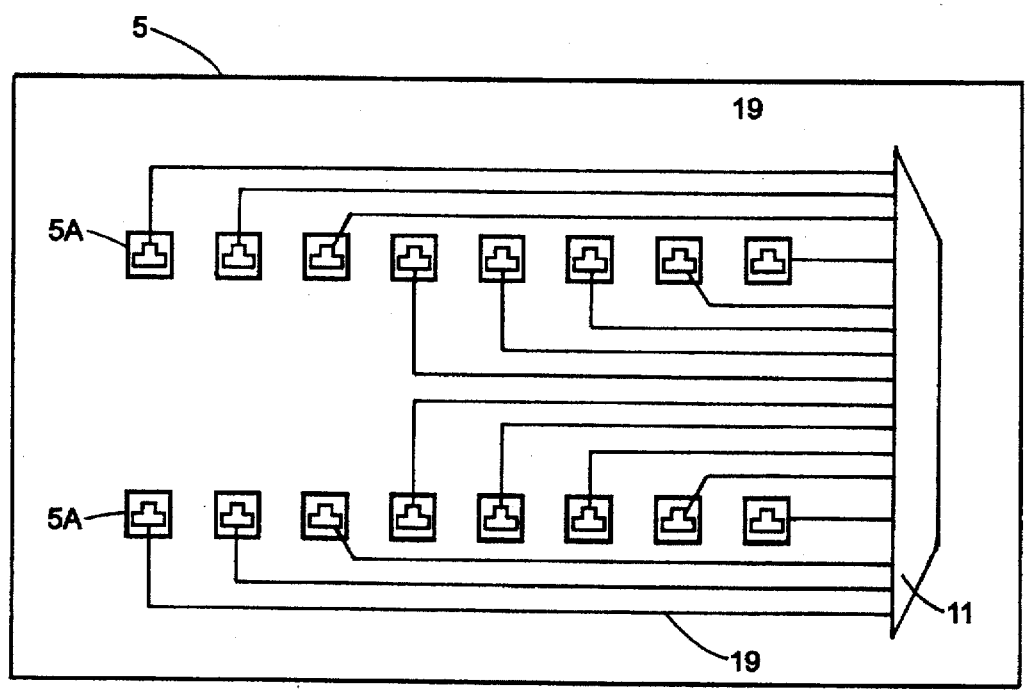
FIG. 2 is a schematic view showing a wiring example within a relay board as a preferred embodiment of the invention.

As shown in FIG. 1, an electric plural core conductor cord 9 connects each apparatus of apparatus group A1 to each apparatus of apparatus group B3 through the cord connecting connectors 5A and 7A of relay boards 5 and 7 with each other. The core conductor cord 9 has unused cores besides those having continuity across the apparatuses within a same cord. It will be appreciated that each apparatus of the preferred embodiment could also be a plurality of apparatuses. Accordingly, each apparatus group would then be a group of a plurality of apparatus groups. In the present invention, information collecting connectors 11 and 13 are mounted on their corresponding relay boards 5 and 7 for the apparatus groups A1 and B3 and as shown in FIG. 2, each unused terminal for the extra cores of the conductor cords 9 on the relay boards 5 and 7 for apparatus group A1 and apparatus group B3 is preliminarily wired to the information collecting connector 11 through a conductor 19. The information collecting conductor 19 is used which is different from a conductor 15 used for apparatus connection as shown in FIG. 3.

Figure 3:
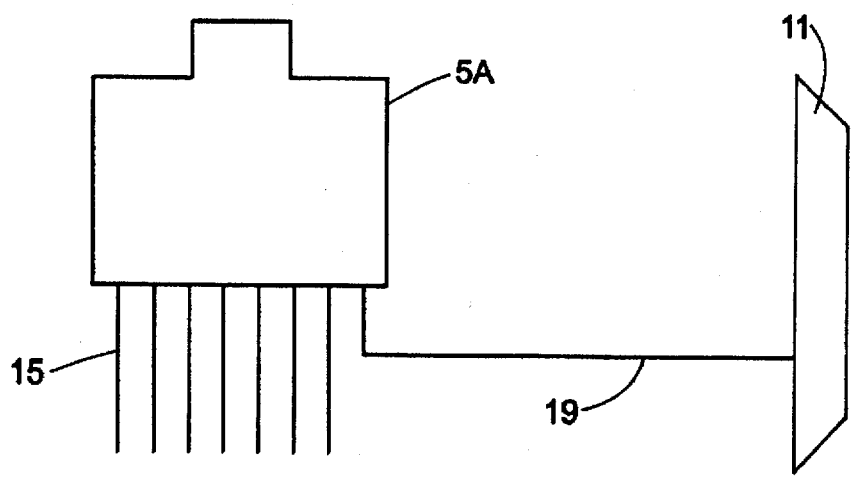
FIG. 3 is a schematic view showing a wiring example from a cord connecting connector as a preferred embodiment of the invention.
Figure 8:
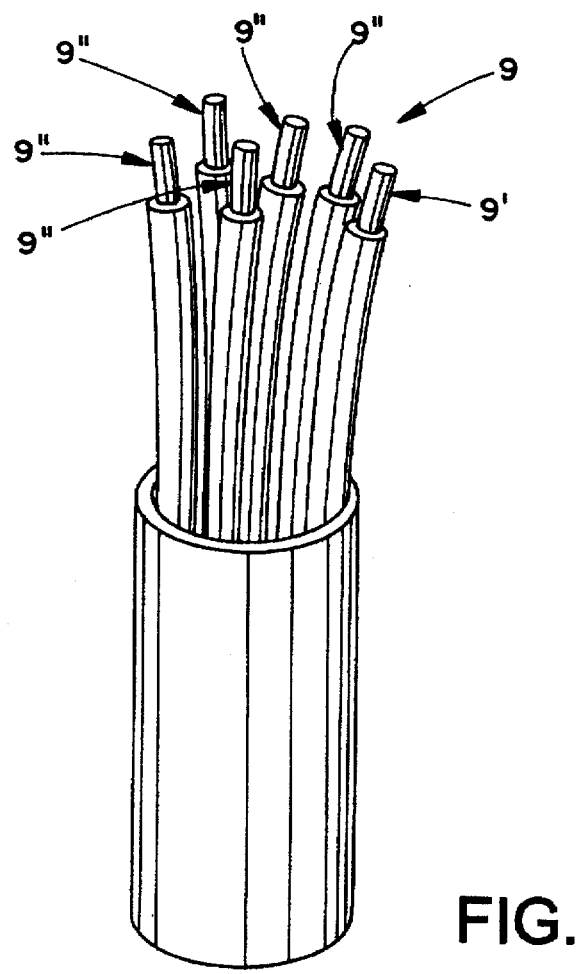
FIG. 8 is an explanatory view of a plural core conductor cord showing used and unused cores.
Figure 4:
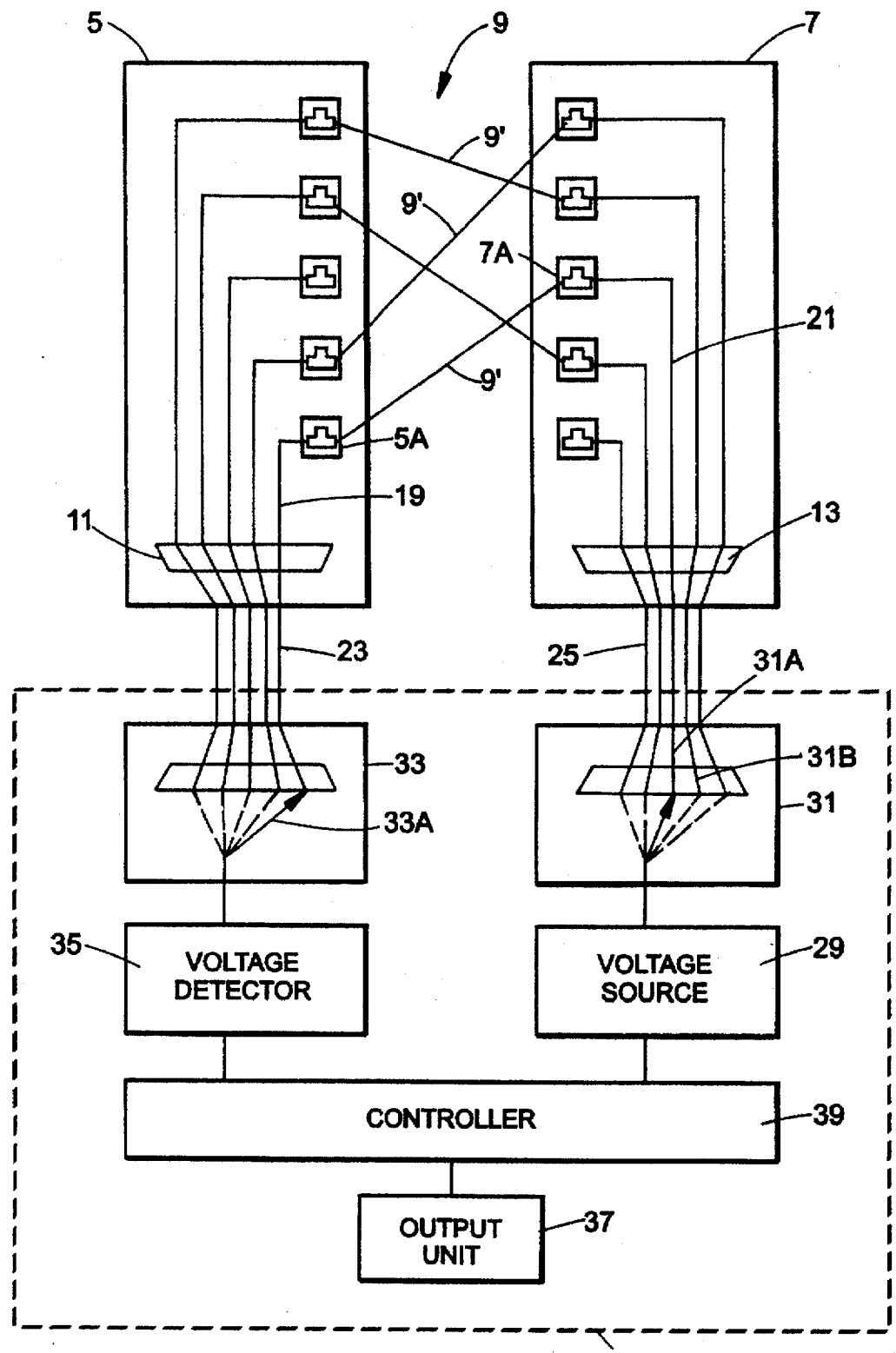
FIG. 4 is an explanatory view showing a method as a preferred embodiment of the invention.

FIG. 4 is a conceptional view showing an acquisition device for connectivity restrictions in which an information collecting connector and wiring shown in FIGS. 1 through 3 are incorporated as a preferred embodiment of the invention.

The device of FIG. 4 comprises a telecommunication cable device for connecting the cord connecting connectors 5A and 7A for the relay boards 5 and 7 connected to each apparatus (refer to FIG. 1) of a plurality of apparatus groups A and B to each other by an electric plural core conductor cord 9; the information collecting connectors 11 and 13 of the apparatus groups A and B for connecting the unused extra cores in the electric conductor cord 9 by conductors 19 and 21; and an information collection device 27 connected to the information collecting connectors 11 and 13 by connection cables 23 and 25. The information collection device 27 described above comprises a voltage applicator 29 and a switch board 31 both for alternately applying a voltage to each terminal of the information collecting connector of the apparatus group B; a voltage (or current) detector 35 connected to each terminal of the information collecting connector 11 for the apparatus group A through a connection cable 23 and a switching board 33; and a control device 39 for successively applying a voltage to each connector of the information collecting connector for the apparatus group B by the switching board 31, detecting the voltage (or current) of each terminal of the information collecting connector for the apparatus group A by the operation of the switching board 33; judging thereby which apparatuses of the apparatus groups A and B are connected with each other; and giving the output of the result to an output unit.

Figure 5:
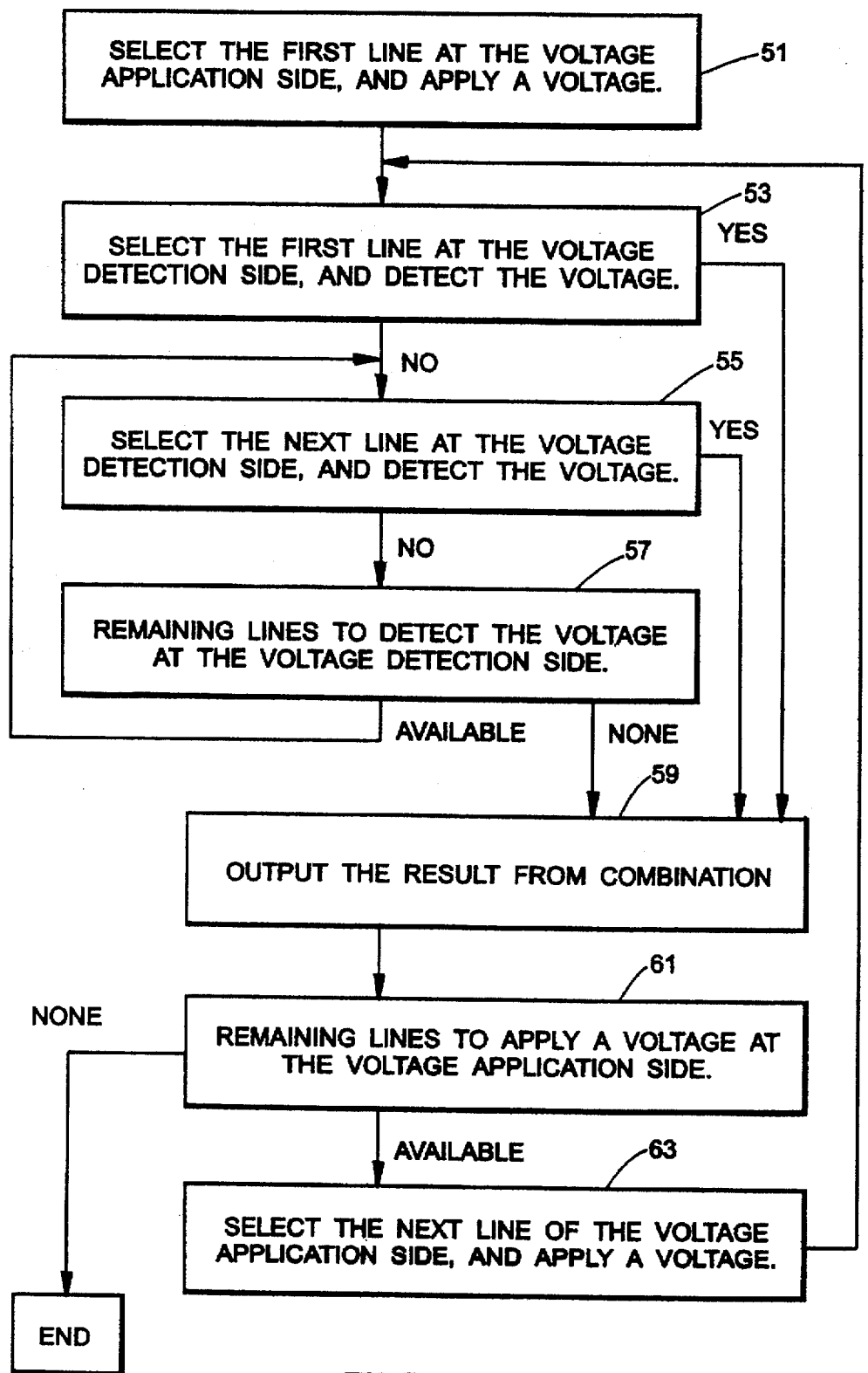
FIG. 5 is an explanatory view showing an operation procedure as a preferred embodiment of the invention.
Figure 6:
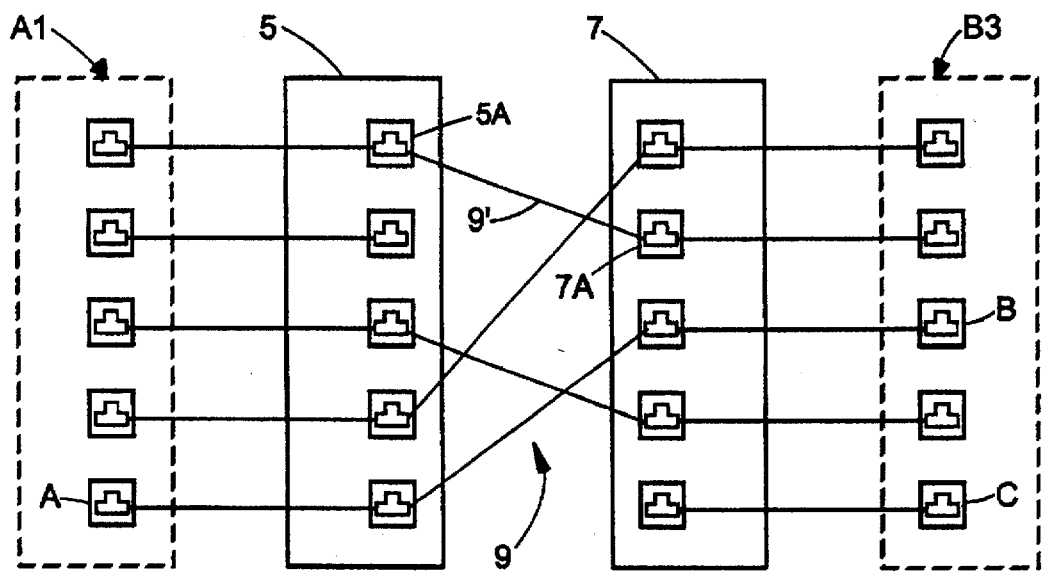
FIG. 6 is a schematic view showing a prior art wiring system.
Figure 7:
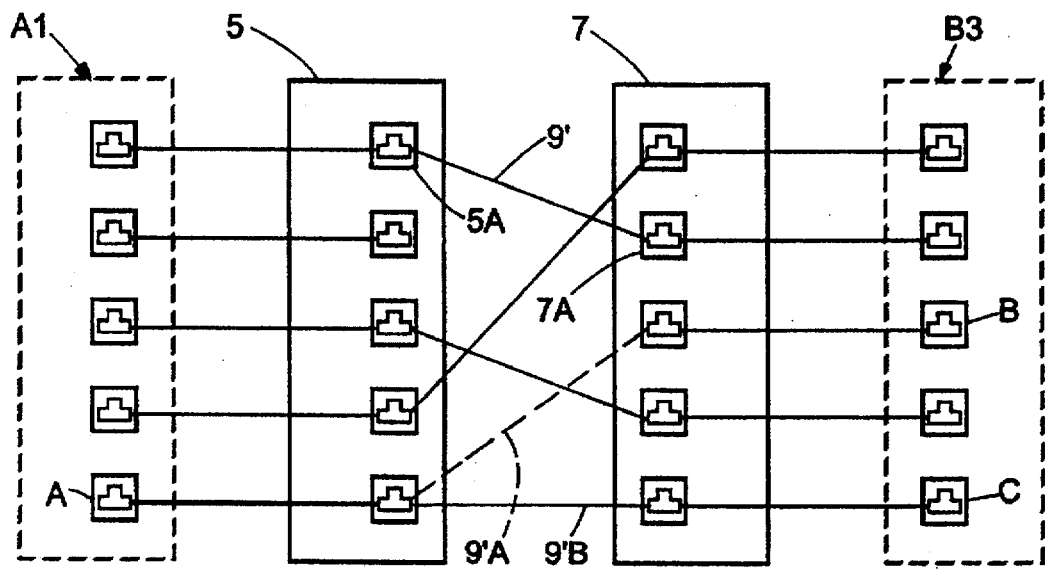
FIG. 7 is an explanatory view showing a connection alternation in the prior art wiring system.

FIG. 5 is an explanatory view showing the flow of the operation in the device in FIG. 4. In the first place, when a voltage is applied to a given conductor 31A by the voltage applicator 29 shown in FIG. 4, the voltage reaches a cord connecting connector 7A corresponding to the conductor 31A by way of a connection cable 25. If the electric plural core conductor cord 9 is subsequently connected to the cord connecting connector 7A, the voltage reaches a given cord connecting connector 5A within the relay board 5 by way of the unused extra core of this cord 9. On the basis of the switching operation of the voltage detector 35 and the switching board 33, the voltage (or current) is detected from the conductor 19 corresponding to the connector 5A through the connection cable 23. The combination of the conductor number for applying a voltage and the conductor number for detecting the voltage is indicated outsides by a result output unit 37. In the case the electric conductor cord 9 is not connected, no voltage can be detected by the voltage applicator 35. Therefore, a voltage is applied to the subsequent conductor 31B by the operation of the switching board 31 and the similar operation is carried out. The operations are alternately carried out by means of the switching boards 31 and 33 and a controller 39.

As described above, it is possible to know which is connected in a plurality of connecting connectors (e.g. 5A, 7A) on the relay boards 5 and 7 swiftly and firmly by the information collection device 27 using the unused extra core within the electric conductor cord 9. In the present invention, it is also possible to replace the partial or total functions of the information collection device 27 in the relay boards 5 and 7 by manual operations. Incidentally, in the present invention, electric was used as a transmission medium, but it is also possible to replace electric with the other equivalent transmission medium (e.g. optical light).

According to the invention, the unused extra cores of the electric conductor cord for connecting between the instrument groups and the relay boards in an information wiring facility are used, thereby the connectivity information of these cord can be obtained accurately and firmly. Furthermore, since the unused extra cores are used, the device cost is cheap. The method can easily be applied to the facilities already built and its industrial value is large.

What we claimed:

1. A method for obtaining connectivity information of wiring facilities, the wiring facilities having plural core conductor cords electrically connected between apparatuses, the plural core conductor cords having both used cores and unused cores, the used cores being electrically connected between apparatuses and the unused cores not being electrically connected between apparatuses, the method comprising the steps of:

providing a telecommunication cable device for connecting between every apparatus of apparatus groups A1 and B3, via a plural core conductor cord having a plurality of used and unused cores, with each other;

providing an information collecting connector for each of said apparatus groups A1 and B3, each information collecting connector connected to the unused cores of said plural core conductor cord via information collecting conductors;

providing an information collection device connected to said information collecting connectors, the information collection device capable of sending a signal though one of the information collecting conductors and receiving the signal through another information collecting conductor;

connecting the used cores of the plural core conductor cord between the apparatuses of apparatus group A1 and the apparatuses of group B3;

connecting unused cores of the plural core conductor cord with the information collecting conductors; and acquiring connectivity information between every apparatus of the apparatus groups A1 and B3 of said conductor cord using the information collection device, the information collection device repeatedly sending a signal through one of the information collecting conductors and receiving the signal through another of the information collecting conductors.

2. The method according to claim 1, wherein said conductor is an electric conductor.

3. A device for obtaining connectivity information of wiring facilities, the wiring facilities having plural core conductor cords electrically connected between apparatuses, the plural core conductor cords having both used cores and unused cores, the used cores being electrically connected between apparatuses and the unused cores not being electrically connected between apparatuses, the device comprising:

a telecommunication cable device for connecting between every apparatus of apparatus groups A1 and B1, via a plural cord conductor cord having a plurality of used and unused cores, with each other;

information collecting connectors of said apparatus groups A1 and B3 for connecting the unused cores of said plural cord conductor cord via an information collecting conductor, and an information collection device connected to said information collecting connectors, said information collection device comprising:

an electric applicator for applying a voltage to each terminal of the information collecting connector for said apparatus group B3, a voltage or current detector connected to each terminal of the information collecting connector for said apparatus group A1, a judging means for judging by the voltage or current detected at the terminal of the information collecting connector for said apparatus A1 by said detector, which apparatus is connected to said apparatus groups A1 and B3 with each other; and a control unit for giving the output of the result to an output unit.

4. A connection information device comprising:

a first apparatus group;

a second apparatus group;

a first apparatus connector group including a plurality of first connectors connected to apparatuses of the first apparatus group;

a second apparatus connector group including a plurality of second connectors connected to apparatuses of the second apparatus group;

a plural core conductor cord having a plurality of used and unused cores at least some of the plurality of used and unused cores provided for connecting at least one of the first connectors to at least one of the second connectors, thereby providing electrical continuity across the at least one connected first and second connectors;

a first information collection conductor connected to unused extra cores of the plural core conductor cord, through unused core conductors associated with the first apparatus connector group;

a second information collection conductor connected to unused extra cores in the plural core conductor cord, through unused core conductors associated with the second apparatus connector group; and an information collection device including, a voltage application unit connected to the first information collection conductor for alternatively applying a voltage to each terminal of the first information collection conductor, and a detector device alternatively connected to each terminal of the second information collection conductor, for detecting connections between the first apparatus connector group and the second apparatus connector group.

5. The method according to claim 1 further including a step of:

periodically repeating the obtaining of connectivity information between every apparatus of the apparatus groups A1 and B3 of said conductor cord with the aid of a controller device.

* * * * *